United States Patent [19]

Gerry

[11] 4,216,412
[45] Aug. 5, 1980

[54] TRANSIENT MODULATED AC IGNITION SYSTEM

[76] Inventor: Martin E. Gerry, 13452 Winthrope St., Santa Ana, Calif. 92705

[21] Appl. No.: 923,828

[22] Filed: Jul. 12, 1978

Related U.S. Application Data

[63] Continuation-in-part of Ser. No. 812,912, Jul. 5, 1977, and a continuation-in-part of Ser. No. 814,457, Jul. 11, 1977, and a continuation-in-part of Ser. No. 868,118, Jan. 9, 1978, and a continuation-in-part of Ser. No. 878,792, Feb. 17, 1978, and a continuation-in-part of Ser. No. 913,437, Jun. 7, 1978.

[51] Int. Cl.² ............... H05B 37/02; H05B 39/04; H05B 41/36
[52] U.S. Cl. ............... 315/209 T; 123/594; 315/172; 315/176; 315/173; 315/209 CD
[58] Field of Search ............... 315/171, 173, 174, 176, 315/209 T, 209 CD, 163, 166, 164, 172, 165; 123/148 E

[56] References Cited

U.S. PATENT DOCUMENTS

| | | | |
|---|---|---|---|
| 3,060,346 | 10/1962 | Sohner | 315/171 |
| 3,906,919 | 9/1975 | Asik et al. | 315/209 CD |
| 3,910,246 | 10/1975 | Canup | 315/209 T |
| 3,972,315 | 8/1976 | Munden et al. | 315/171 |
| 4,033,316 | 7/1977 | Birchenough | 315/176 |
| 4,136,301 | 1/1979 | Shimojo et al. | 315/176 |

Primary Examiner—Saxfield Chatmon, Jr.

[57] ABSTRACT

An AC powered ignition system employs a rectangular wave power source and a timer for controlling igniter firings. Such timer intermittently interrupts the flow of DC bias current in active stages of the AC power source so as to create a large transient current and high induced voltage in an output transformer. The large transient current is intermodulated with a Kettering type transient to provide high energy firing levels to igniters in a fuel burning engine. The output transformer is coupled to an ignition transformer and to a reactance compensating capacitor to energize a distributor and igniters connected to the distributor.

6 Claims, 16 Drawing Figures

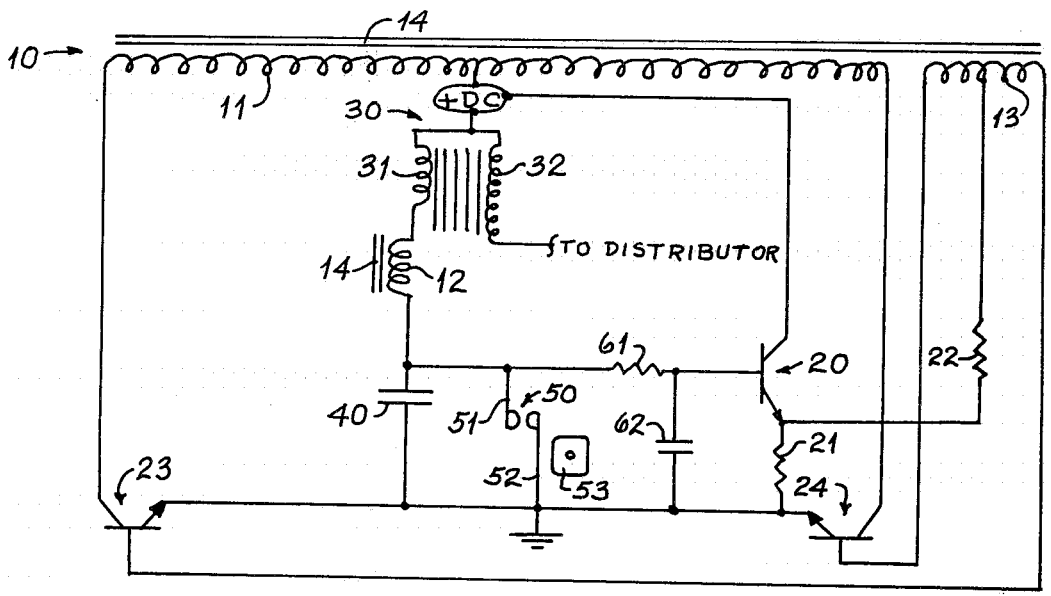
FIG. 1
FIG. 2
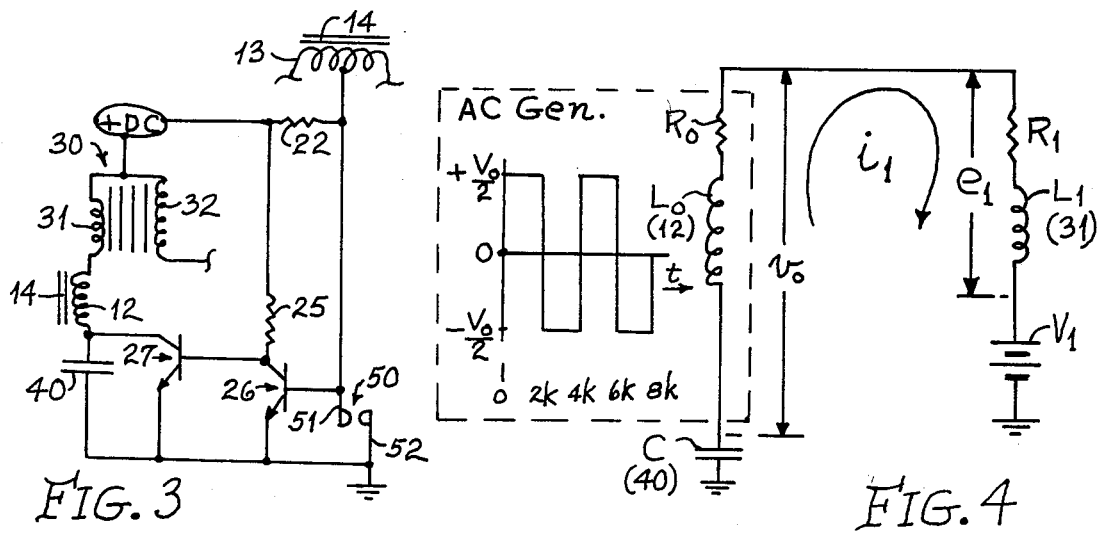
FIG. 3
FIG. 4

$$v_o(t) = V_o\left[u(t) - \sum_{n=1}^{\infty}(-1)^n u(t-2nk)\right] \quad (1)$$

$$v_o(s) = \mathcal{L} v_o(t) = \frac{V_o}{s}\tanh ks \cong \frac{V_o}{s}\left[1 - 2e^{-2ks} + 2e^{-4ks}\right] \quad (2)$$

$$i_o = \frac{V_1}{R}(1-e^{-\frac{R}{L}t})\Big|_{t=1.67\times 10^{-3}\text{ SECONDS}} = 0.872 \text{ AMPERES} \quad (3)$$

$$\text{where } R = R_o + R_1$$
$$L = L_o + L_1$$

$$\alpha = L i_o = 1.744 \times 10^{-2} \text{ VOLTS} \quad (4)$$

$$\alpha + \frac{V_o}{s}(1 - 2e^{-2ks} + 2e^{-4ks}) = \left(Ls + R + \frac{1}{Cs}\right)I_1 \quad (5)$$

$$I_1 = \frac{\alpha + \frac{V_o}{s}(1 - 2e^{-2ks} + 2e^{-4ks})}{Ls + R + \frac{1}{Cs}}$$

$$= \frac{\alpha s + V_o(1 - 2e^{-2ks} + 2e^{-4ks})}{L\left(s + \frac{R}{2L} - j\frac{1}{\sqrt{LC}}\right)\left(s + \frac{R}{2L} + j\frac{1}{\sqrt{LC}}\right)} \quad (6)$$

$$i_1 = \mathcal{L}^{-1} I_1 = \sum \text{Residues } A_o + B_o \text{ at Poles } S = -\frac{R}{2L} \pm j\frac{1}{\sqrt{LC}} \quad (7)$$

$$\frac{\left[\alpha s + V_o - 2V_o e^{-2ks} + 2V_o e^{-4ks}\right]e^{st}}{\left(s + \frac{R}{2L} - j\frac{1}{\sqrt{LC}}\right)\left(s + \frac{R}{2L} + j\frac{1}{\sqrt{LC}}\right)} = \frac{A_o}{s + \frac{R}{2L} - j\frac{1}{\sqrt{LC}}} + \frac{B_o}{s + \frac{R}{2L} + j\frac{1}{\sqrt{LC}}} \quad (8)$$

$$A_o\Big|_{s=-\frac{R}{2L}+j\frac{1}{\sqrt{LC}}} = \frac{1}{2j}\sqrt{\frac{C}{L}}\, e^{-\frac{R}{2L}t}\Bigg[\left(-\frac{\alpha R}{2L} + V_o\right)e^{j\frac{t}{\sqrt{LC}}}$$
$$-2V_o e^{\frac{kR}{L}} e^{j\frac{(t-2k)}{\sqrt{LC}}}$$
$$+2V_o e^{\frac{2kR}{L}} e^{j\frac{(t-4k)}{\sqrt{LC}}}$$
$$+ j\frac{\alpha}{\sqrt{LC}} e^{j\frac{t}{\sqrt{LC}}}\Bigg] \quad (9)$$

*FIG. 5a*

$$B_o\Big|_{s=-\frac{R}{2L}-j\frac{1}{\sqrt{LC}}} = \text{COMPLEX CONJUGATE OF } A_o$$

$$= -\frac{1}{2j}\sqrt{\frac{C}{L}} e^{-\frac{R}{2L}t}\left[\left(-\frac{\alpha R}{2L}+V_o\right)e^{-j\frac{t}{\sqrt{LC}}}\right.$$

$$-2V_o e^{\frac{kR}{L}} e^{-j\frac{(t-2k)}{\sqrt{LC}}}$$

$$+2V_o e^{\frac{2kR}{L}} e^{-j\frac{(t-4k)}{\sqrt{LC}}}$$

$$\left.-j\frac{\alpha}{\sqrt{LC}} e^{-j\frac{t}{\sqrt{LC}}}\right] \quad (10)$$

Summing (9) and (10):

$$i_1 = A_o + B_o = \sqrt{\frac{C}{L}} e^{-\frac{R}{2L}t}\left\{\left(-\frac{\alpha R}{2L}+V_o\right)\frac{\left(e^{j\frac{t}{\sqrt{LC}}} - e^{-j\frac{t}{\sqrt{LC}}}\right)}{2j}\right.$$

$$-2V_o e^{\frac{kR}{L}} \frac{\left(e^{j\frac{(t-2k)}{\sqrt{LC}}} - e^{-j\frac{(t-2k)}{\sqrt{LC}}}\right)}{2j}$$

$$+2V_o e^{\frac{2kR}{L}} \frac{\left(e^{j\frac{(t-4k)}{\sqrt{LC}}} - e^{-j\frac{(t-4k)}{\sqrt{LC}}}\right)}{2j}$$

$$\left.+\frac{\alpha}{\sqrt{LC}} \frac{\left(e^{j\frac{t}{\sqrt{LC}}} + e^{-j\frac{t}{\sqrt{LC}}}\right)}{2}\right\} \quad (11)$$

$$i_1 = \sqrt{\frac{C}{L}} e^{-\frac{R}{2L}t}\left\{\left(-\frac{\alpha R}{2L}+V_o\right)\sin\frac{t}{\sqrt{LC}}\right.$$

$$-2V_o e^{\frac{kR}{L}} \sin\frac{(t-2k)}{\sqrt{LC}}$$

$$+2V_o e^{\frac{2kR}{L}} \sin\frac{(t-4k)}{\sqrt{LC}}$$

$$\left.+\frac{\alpha}{\sqrt{LC}} \cos\frac{t}{\sqrt{LC}}\right\} \quad (12)$$

FIG. 5b

Using parameter values from Tables A & B in (12):

$$i_1 = 0.948 e^{-170t} \left\{ 0.995 \sin \frac{t}{\sqrt{LC}} \right.$$

$$-2.04 \sin \frac{(t-2k)}{\sqrt{LC}}$$

$$+2.08 \sin \frac{(t-4k)}{\sqrt{LC}}$$

$$\left. + 0.92 \cos \frac{t}{\sqrt{LC}} \right\} \qquad (13)$$

Using Tables (13a) through (13d), equation (13) is graphed in FIG. 6.

The induced voltage in primary winding $L_1$ by Faraday's law of induction, is:

$$e_1 = -L_1 \frac{di_1}{dt}, \text{ which applied to (12):} \qquad (14)$$

$$e_1 = -L_1 \sqrt{\frac{C}{L}} e^{-\frac{R}{2L}t} \left\{ \left(-\frac{\alpha R}{\sqrt{LC}} + V_0\right) \left[\frac{1}{\sqrt{LC}} \cos \frac{t}{\sqrt{LC}} \right.\right.$$

$$\left. -\frac{R}{2L} \sin \frac{t}{\sqrt{LC}} \right]$$

$$-2V_0 e^{\frac{kR}{L}} \left[\frac{1}{\sqrt{LC}} \cos \frac{(t-2k)}{\sqrt{LC}} \right.$$

$$\left. -\frac{R}{2L} \sin \frac{(t-2k)}{\sqrt{LC}} \right]$$

$$+2V_0 e^{\frac{2kR}{L}} \left[\frac{1}{\sqrt{LC}} \cos \frac{(t-4k)}{\sqrt{LC}} \right.$$

$$\left. -\frac{R}{2L} \sin \frac{(t-4k)}{\sqrt{LC}} \right]$$

$$+\frac{\alpha}{\sqrt{LC}} \left[-\frac{1}{\sqrt{LC}} \sin \frac{t}{\sqrt{LC}} \right.$$

$$\left.\left. -\frac{R}{2L} \cos \frac{t}{\sqrt{LC}} \right] \right\} \qquad (15)$$

FIG. 5c

Since $\frac{1}{\sqrt{LC}} \gg \frac{R}{2L}$, (15) is simplified to:

$$e_1 = -\frac{L_1}{L} e^{-\frac{R}{2L}t} \left\{ \left(-\frac{\alpha R}{\sqrt{LC}} + V_0\right) \cos\frac{t}{\sqrt{LC}} - \frac{\alpha}{\sqrt{LC}} \sin\frac{t}{\sqrt{LC}} \right.$$

$$-2V_0 e^{\frac{kR}{L}} \cos\frac{(t-2k)}{\sqrt{LC}}$$

$$\left. +2V_0 e^{\frac{2kR}{L}} \cos\frac{(t-4k)}{\sqrt{LC}} \right\} \quad (16)$$

Substituting values from Tables A & B:

$$e_1 = e^{-170t} \left\{ 319 \cos\frac{t}{\sqrt{LC}} + 138 \sin\frac{t}{\sqrt{LC}} \right.$$

$$+ 306 \cos\frac{(t-2k)}{\sqrt{LC}}$$

$$\left. - 312 \cos\frac{(t-4k)}{\sqrt{LC}} \right\} \quad (17)$$

Using Tables (17a) through (17d), equation (17) is graphed in FIG. 7.

$$P_{(igniter\ power)} = \eta T^2 i_1 e_1 = 0.9 \times 0.25 \times 5 \times 710$$

$$= 798.75\ \text{WATTS} \quad (18)$$

$$\mathcal{E}_{(igniter\ energy)} = Pt = 798.75 \times 0.833 \times 10^{-3}$$

$$= 0.665\ \text{WATT-SECONDS} \quad (19)$$

$$N = \frac{\mathcal{E}_{(igniter)}}{\mathcal{E}_{(kettering)}} = \frac{0.665}{0.936 \times 10^{-2}} = 71$$

$$= 7100\% \quad (20)$$

FIG. 5d

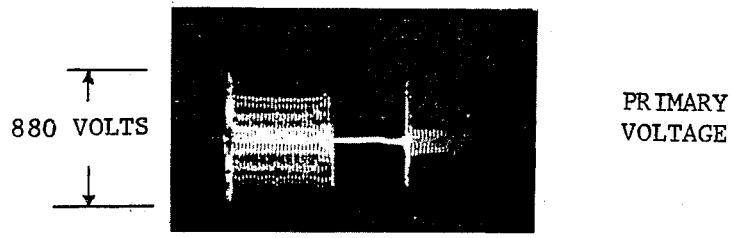
880 VOLTS
PRIMARY VOLTAGE
FIG. 9
4 AMPERES
PRIMARY CURRENT
FIG. 10
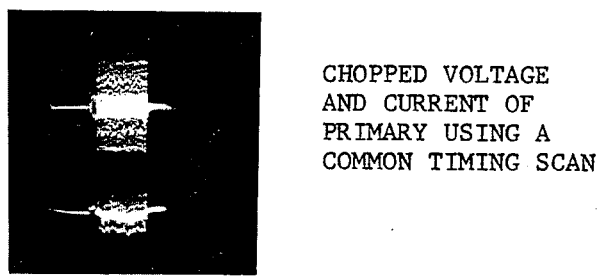
CHOPPED VOLTAGE AND CURRENT OF PRIMARY USING A COMMON TIMING SCAN
FIG. 11
RADIAL IGNITION ARCS
USING CHAMPION TYPE N-13Y IGNITER
WITH GAP ADJUST MEMBER REMOVED
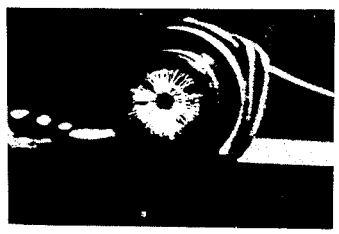 
DISTRIBUTOR ROTOR AT STANDSTILL
DISTRIBUTOR ROTOR DRIVEN AT MEDIUM SPEED
FIG. 12
FIG. 13

TRANSIENT MODULATED AC IGNITION SYSTEM

CROSS-REFERENCE TO RELATED APPLICATIONS

This application is a continuation-in-part of copending applications Ser. No. 812,912 filed July 5, 1977, Ser. No. 814,457 filed July 11, 1977, Ser. No. 868,118 filed Jan. 9, 1978, Ser. No. 878,792 filed Feb. 17, 1978, and Ser. No. 913,437 filed June 7, 1978.

BACKGROUND OF THE INVENTION

This invention is in the field of ignition systems for fuel burning engines and more particularly in such systems wherein the igniters thereof are AC powered. Still more specifically, it is in an area of such ignition systems wherein the AC powering means have active signal generating stages which are controlled by a timer by switching the bias current in such stages on and off for each firing cycle. The invention is also in the area where such AC power is intermodulated with a Kettering type transient.

The prior art appears to be devoid of bias modulation control of ignition systems for fuel burning engines and also of AC powered systems which are transient intermodulated, and the closest prior art is summarized briefly hereinbelow.

U.S. Pat. No. 3,820,520, shows DC bias applied to transistor base inputs without any means for interrupting the base current flow. Such patent uses a separate winding of an output transformer in series with a winding of a saturable core transformer connected to contactors, to provide magnetic biasing of the output transformer. The flow of a large DC current in these windings will load down the oscillator and cause it to stop oscillation. Hence, it is clear that no interruption of DC bias current in the base circuits of the transistors is shown by this patent and further that biasing is magnetic saturation rather than electrical switching, and still further that when magnetically biased, the transistors stop oscillating due to slow-acting magnetic core saturation.

U.S. Pat. No. 3,749,973, does not show DC bias current in the transistor stages being interrupted. As in U.S. Pat. No. 3,820,520, this circuit is magnetically biased by means of DC current through a winding to saturate the transformer and stop oscillation.

U.S. Pat. No. 3,792,695 does not show DC bias current in the transistor stages being interrupted. This patent has the same main oscillator circuit as that of U.S. Pat. No. 3,820,520, and hence its operation is the same.

U.S. Pat. No. 3,808,513, likewise does not have its transistor base inputs switched to interrupt any DC bias current thereto. A winding provides magnetic saturation of a transformer when the winding is keyed with DC current to stop oscillation.

U.S. Pat. No. 3,853,106, likewise does not have its transistor base inputs switched to interrupt any DC bias current. As discussed in connection with U.S. Pat. No. 3,820,520, a winding is used to saturate the transformer and stop oscillation.

U.S. Pat. No. 3,861,369 shows only a switching means substitute for breaker points, the output of which is directly connected to a saturation winding of a saturable core transformer. The features, are best described by the patent which are similar to those described in connection with U.S. Pat. No. 3,820,520.

U.S. Pat. No. 3,847,219 shows a two transformer oscillator. One transformer is saturated by a winding having DC current flowing therethrough which stops oscillation. No DC bias current in base of the transistors thereof is interrupted. Saturation of that one transformer causes oscillation to stop.

U.S. Pat. No. 3,818,885, shows its oscillating transistor input circuits (bases) as not having an interrupted switching means therein so that no DC bias current is interrupted in the base circuits. When DC current flows through a transformer winding, the oscillator stops oscillating due to this slow magnetic biasing.

U.S. Pat. No. 3,910,246, similar to U.S. Pat. No. 3,818,885, shows its oscillating transistor input circuits uninterrupted by switching means. Also this patent has a transformer winding which functions similarly to the transformer winding of U.S. Pat. No. 3,818,885.

U.S. Pat. No. 3,913,550 does not show interruption of biasing base current of the transistors in the oscillating circuit. Its operation as far as starting and stopping of oscillation is the same as stated in connection with U.S. Pat. No. 3,820,550, also utilizing a transformer winding to saturate a transformer.

U.S. Pat. No. 3,779,226 does not show interruption of bias current in base circuits of the oscillator. Rather, as already discussed in connection with U.S. Pat. No. 3,820,520, a winding of a transformer has a DC current passed therethrough to saturate the transformer and stop oscillation of the transistor circuit.

U.S. Pat. No. 3,758,821 may be described in terms similar to the description for U.S. Pat. No. 3,847,129.

U.S. Pat. No. 3,593,696 does not show DC bias current in oscillator stages being interrupted to switch the oscillator on and off. This patent has a magnetic pulser triggering a differentiator, which triggers a multivibrator. The multivibrator applies an input to the oscillator through an amplifier. There is no showing how the square waves of the multivibrator control oscillations of the oscillator. But even if shown, and even if it is assumed that the square waves from the multivibrator circuit trigger the oscillator, such square waves are AC, and still further it is not shown where such triggering occurs in the oscillator even if by use of the square waves.

U.S. Pat. No. 3,401,327 does not show DC bias current interruption in bases of the transistors thereof. These bases are connected to a power means without any switching of power thereto. The only switching member is a transistor that short circuits a resistor during its conduction which effects a change in frequency of oscillation.

U.S. Pat. No. 3,866,107, likewise does not show interruption of DC bias current or base current to its transistors. In fact there is no DC power to the bases of either of the two transistors to enable current flow to start in such transistors.

U.S. Pat. No. 3,867,683 does not show DC bias current applied to the bases or input stages of the inverter circuit. A transformer input to such bases is provided. The transistors are controlled by phase opposing outputs from an oscillator connected to the bases of such transistors.

SUMMARY OF THE INVENTION

To avoid the inefficiencies, slow time response to control means of the AC voltage and current outputs and the low AC voltage and current outputs of prior art ignition systems, a system was devised that keys or modulates DC bias currents in a power generation stage or stages, so that high level current transients and high level induced voltages will be efficiently created upon such keying or modulation.

To enhance the firing energy level, the Kettering transient is generated in the same bias keyed system so as to intermodulate the AC output thereof with the Kettering transient in an ignition transformer primary circuit.

Hence, an objective of this invention is to provide the ability to control high power output from an AC power source by keying on-off the DC bias to transistors of such power source or to substitutes for transistors thereof.

Another objective of this invention is to produce high transient current and high transient induced voltage modulation patterns which are only possible when the system is switched on and off by current flow interruption of the input or bias circuits and not possible by magnetic saturation of an output transformer core which is inherently slow-acting.

Still another objective of this invention is to intermodulate the AC generated output with the simultaneously generated Kettering transient to provide increased energy to the ignition transformer.

A further objective of this invention is to obtain operation of the system at high efficiency, and where semiconductor components are used to maintain them cool throughout the operation period of the system, which objective is also not possible when a circuit is magnetically saturated to quench oscillation.

Yet a further objective of this invention is the ability to utilize a simple output transformer with a minimum of three windings which objective is not possible by other systems and still obtain on and off control of AC power.

Still a further objective of this invention is to provide an ignition system which draws very low DC power from an automotive battery and yet provide high instantaneous power and energy to fire the igniters therein.

Accordingly, the inventive ignition system comprises at least one AC power generation stage, timing means for intermittently interrupting flow of DC biasing current in such stage or stages, and an output transformer coupled to such stage or stages for energizing a high voltage distributor.

The output transformer may first be coupled to an ignition transformer primary winding, to a capacitor and to a conventional high voltage distributor, which capacitor is used to compensate for at least a portion of the inductances of the output transformer and ignition transformer.

The capacitor is intermittently short-circuited to provide a typical Kettering transient which is used to intermodulate with the keyed AC transient power in the ignition transformer primary.

The timer used provides the ability of the ignition system to short circuit the capacitor during the keying period of the AC power source so as to provide the Kettering transient simultaneously with the AC power.

Such reactance compensating capacitor therefore performs a multiple function, including its capacitive function in the Kettering circuit as well as its reactance compensation function for maximizing AC current flow in the ignition transformer primary circuit.

The output transformer may have a three winding structure, one of which is used for feedback of induced AC from the primary of such output transformer to the inputs of the power generation stage or stages, and the keyed DC bias is applied through this feedback winding by means of one of several different types of timing circuits. Certain of these timing circuits are well known in the art, whereas others are novel.

One timing circuit that may also be used is of the magnetic pulse type as shown in applicant's application Ser. No. 913,437 filed June 7, 1978. Other timing circuits that may be used comprise a driven timing wheel and contactor wherein the timing wheel has electrical insulating members at its periphery to provide timing circuit current interruption. Another timing circuit that may also be used include a driven wheel that has an aperture at its periphery to permit light to pass therethrough and impinge on a photoelectric cell for simulating operation of a pair of conventional contactors in a Kettering system.

Although a rectangular wave AC power unit was used, it should be understood that AC units providing triangular, saw-tooth, sinusoidal or other wave shapes may likewise be used in the inventive system.

BRIEF DESCRIPTION OF THE DRAWINGS

FIG. 1 is an electrical schematic of the ignition system according to the invention.

FIG. 2 is a table of the switching logic of certain portions of FIG. 1.

FIG. 3 is an electrical schematic of a portion of the ignition system showing alternate manner of control.

FIG. 4 is an equivalent circuit of the inventive ignition system for the purpose of deriving the voltage and current relationships therefrom.

FIGS. 5a–5d comprise mathematical equational transient relationships that prevail in the inventive system defining current, voltage, power and energy therein.

FIG. 9 is a photographed oscilloscopic calibrated pattern of the voltage across the ignition transformer primary winding showing the actual peak-to-peak voltage swings.

FIG. 10 is a photographed oscilloscopic calibrated pattern of the current in the ignition transformer primary winding showing the actual peak-to-peak current swings.

FIG. 11 is a photographed oscilloscopic chopped and multiplexed voltage and current patterns of the ignition transformer primary utilizing a common time base, showing the in-phase relationships between the voltage and current modulation envelopes due to proper selection of the compensating capacitor.

FIG. 12 is a photographed view of the base of an igniter showing the firing arcs when the distributor rotor is at standstill.

FIG. 13 is a photographed view of the base of an igniter showing the firing arcs when the distributor rotor is driven at a speed corresponding to medium engine rotational speed.

DETAILED STRUCTURAL DESCRIPTION

Figure 8:
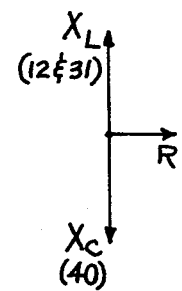
FIG. 8 is a phasor diagram showing the compensating effect of a capacitor in the ignition transformer primary circuit.

Referring to FIGS. 1-3, the inventive system shown therein is used to provide a Kettering type transient to intermodulate with AC power to fire igniters of a fuel burning engine. Timing control circuits are provided for intermittently keying or modulating DC bias so as to switch the AC power unit on and off, and to precharge the ignition transformer primary winding and the output winding of an output transformer of the AC power unit, thereby providing high transient current and voltage waves to a high voltage distributor so as to sequentially energize igniters connected thereto.

Referring specifically to FIG. 1, a transistor power generator thereof includes an output transformer 10 having a center-tapped primary winding 11, a secondary or output winding 12 and a tertiary or feedback winding 13, wound on a steel or ferrite core 14. Transformer 10 may be commercially obtained as type TY-85, made by Triad-Utrad Division, Litton Industries Inc., of Huntington, Indiana. Such transformer will provide oscillating frequencies of between 2.5 and 5 kHz, depending on current drawn through the transformer and other circuit parameters of the load connected thereto. In this instance, the basic oscillation repetion rate was in the order of 2.5 kHz of generally rectangular wave shape.

Winding 11 is connected at its outer ends respectively to the collectors of a pair of transistors 23 and 24, in this illustration of the NPN type, the emitters of which are at ground or negative battery or negative DC potential. It will be understood throughout this discussion that the conventional ground symbol will indicate negative DC potential as well as AC signal return path.

A capacitor, not shown, having a rating of at least one microfarad may optionally be connected between the negative and positive DC terminals of the AC power unit in event that the leads from the automotive battery are long enough to exhibit too much inductance. In any event the presence or absence of such capacitor is not critical to the operation of this system.

The center tap of winding 11 is connected to the positive DC battery terminal and to a common junction of primary 31 and secondary 32 of ignition transformer 30. The other end of primary 31 is connected to one end of output winding 12. The other end of output winding 12 is connected to capacitor 40 and to a junction of contactor 51 of points 50 and resistor 61. The other end of capacitor 40 as well as contactor 51 of points 50 are at ground or negative DC potential. Cam 53 driven by a conventional distributor shaft, not shown, therefore activates points 50 intermittently as the engine is in operation to open and close contactors 51-52.

Winding 13 of transformer 10 has its outer ends connected to the bases of transistors 23 and 24 respectively for feeding induced voltage from primary 11 to such bases to maintain transistors 23 and 24 in oscillation mode.

The other end of resistor 61 is connected to one side of capacitor 62 and to the base of control transistor switch 20. The other side of capacitor 62 is at ground potential. The collector of NPN transistor 20 is at positive DC potential therefore enabling transistor 20 to conduct when its base is biased positively with respect to its emitter. The emitter of transistor 20 has biasing resistor 22 connected between it and the center tap of winding 13 for enabling DC bias to be fed to the bases of transistors 23 and 24, the ohmic value of resistor 22 determining the DC bias current of transistors 23 and 24. Ground potential for emitter of transistor 20 is obtained through resistor 22 and the base-emitter junctions of transistors 23 or 24. However, to assure more rapid switching action a high ohmic value resistor 21, such as 15,000 ohms, may be optionally used between the emitter of transistor 20 and ground.

Type 2N6284 Darlington circuit power transistors as transistors 23 and 24, and 2N3055H type as transistor 20 have been found to give excellent results. Resistor 61 of 100,000 ohms, capacitor 62 of 1.5 microfarads, resistor 22 of 300 ohms and capacitor 40 of 0.25 microfarads have been found, among other combinations possible, to provide such performance as evidenced by the photographic results discussed hereinbelow.

It should be noted that capacitor 40 provides a dual function in this system. It firstly acts as a capacitor in a typical Kettering system which capacitor is by-passed during charging mode of the ignition transformer primary winding, and secondly when the proper capacitive value is selected, it acts as a means for maximizing AC current flow from the AC source in the primary winding 31 and in output winding 12. Maximum AC current will flow when the capacitive value of capacitor 40 is such so as to compensate for the inductive reactances of windings 12 and 31 to the principal generated frequency of the the AC unit.

Referring specifically to FIG. 2, the switching logic of FIG. 1 circuit may be examined when contactors 51 and 52 of points 50 are closed or opened. In the closed mode, capacitor 40 is short circuited by contactor pair 50 permitting windings 12 and 31 to be charged with DC current. A typical charge period is 1.67 milliseconds for an 8 cylinder engine driven at 6000 rpm. During such charge period, transistor 20 is OFF or no collector current flows inasmuch as its base will be at negative or ground potential, and hence no base current will flow in transistors 23-24, and no AC output will be provided in winding 12. Hence, secondary winding 32 of ignition transformer will have substantially no output voltage thereacross.

When cam 53 is driven so as to open points 50, capacitor 40 will have its electrical short-circuit removed therefrom and the charge in windings 12 and 31 will flow into capacitor 40 causing such circuit to oscillate in a typical Kettering ignition circuit manner. However, at the same time as points 50 are opened, the base of transistor 20 will be at positive DC potential with respect to its emitter, turning ON transistor 20 and thereby feeding positive DC bias to the bases of transistors 23-24 to cause such transistors to oscillate, generating a generally rectangular repetition wave in transformer 10 and providing a transient output from the AC unit in winding 12 to intermodulate with the Kettering transient in primary winding 31. Such intermodulated transient current will induce a high transient voltage in primary 31 which will be transferred to secondary 32 to feed a conventional distributor coupled to igniters (not shown) in conventional sequential switching manner, so as to energize such igniters in such sequence with high electrical energy and thereby more effectively ignite and consume the fuel in the ignition chamber of the fuel burning engine powered by such igniters.

It should be noted that the purpose of resistor 61 and capacitor 62 is for by-passing AC voltages present across capacitor 40 during the period when contactor pair 51-52 of points 50 are open, so as to minimize AC from being present at the base of transistor 20 and thereby assure reliable switching action of transistor 20 and sharp voltage and current cut-off waveforms in primary 31 when contactors 51-52 are closed.

Referring specifically to FIG. 3, the circuit of FIG. 1 is utilized except that the control means for charging inductors 12 and 31 and biasing bases of transistors 23-24 are differently effected.

With respect to such control circuit, it may be seen that bias resistor 22 is connected to the positive DC terminal at one end and at the other end to the center tap of winding 13.

When contactors 51-52 of points 50 are closed, the center tap of winding 13 and hence the bases of transistors 23-24 will be at negative or ground potential and cause transistors 23-24 to be quiescent or non-oscillating. Transistor 26 base will be at ground potential causing transistor 26 to be non-conducting and therefore applying a positive DC potential to the base of transistor 27 to cause collector current to flow in transistor 27 thereby short-circuiting capacitor 40. Positive DC potential for the collector of transistor 27 is obtained through windings 12 and 31. During this mode of operation, windings 12 and 31 will be charged by DC current flowing therethrough.

When contactors 51-52 of points 50 are open, the center tap of winding 13 is at positive DC potential thereby causing transistors 23-24 to oscillate. In this mode of operation, the base of transistor 26 is positive causing collector current to flow through resistor 25 and thereby bringing the base of transistor 27 to a negative potential so that transistor 27 is non-conducting. If such transistor has a high impedance between its collector and emitter, capacitor 40 will not be short-circuited by the connection of the collector of transistor 27 to the junction of capacitor 40 and winding 12. Hence, both power from the AC unit and due to the Kettering transient, as discussed in connection with FIG. 2, will flow in intermodulated form in primary 31, in similar manner as described in connection with the circuit of FIG. 1.

It should be emphasized that the manner of control of bias current in the transistors such as 23-24 or in other oscillating circuits, is not limited to the control circuits discussed above or the oscillating circuits illustrated herein, inasmuch as applicant's copending applications Ser. No. 812,912 filed July 5, 1977, Ser. No. 814,457 filed July 11, 1977, Ser. No. 868,118 filed Jan. 9, 1978, Ser. No. 878,792 filed Feb. 17, 1978, or Ser. No. 913,437 filed June 7, 1978 suggest and show other control circuits as well as other oscillating circuits that may be used to effect this invention.

DETAILED OPERATIONAL DESCRIPTION

Referring to FIGS. 1, 8 and 11 and Tables A and B, wherein the laboratory tests were made utilizing the circuit of FIG. 1, Champion type N-13Y igniters were used in the laboratory test set up wherein the gap adjusting member from such igniters were completely removed, permitting individual arcs of about 0.5 inches diameter to fire across the base of these igniters. A conventional distributor was motor driven so as to simulate high voltage distribution to the several igniters and switching action between igniters in a simulated automotive system.

Inasmuch as the voltage induced in primary winding 31 was exceptionally high, it was impossible to measure it by connecting an oscilloscope to the primary winding, since the calibrated attenuator built into the oscilloscope was out of range to sufficiently attenuate the voltage present across primary 31 so that the entire voltage modulation envelope could be viewed on the oscilloscope screen. Hence, an additional attenuator in the form of a resistive voltage divider was used wherein two resistors in series were connected across primary 31. These resistors were of 1000 and 10,000 ohm values, with the 1000 ohm resistor connected to the positive DC terminal of ignition transformer 30 (the common terminal of the primary and secondary windings). Additionally, a one-ohm high power resistor was connected in between such terminal and plus DC. Such resistors permitted one channel of the dual channel Hewlett-Packard 50 megacycle oscilloscope to be connected across the one ohm resistor for measuring and observing the current wave in primary 31, and the other channel for observing the voltage developed across primary 31 by connecting the channel input leads between plus DC and the junction point of the 1000 and 10,000 ohm resistors.

Thus, considering the sensitivity of the oscilloscopic channels with their built-in calibrated attenuators set to convenient positions, the sensitivity setting of the voltage measuring channel would be multiplied by 11 and also multiplied by the centimeter deflection of the voltage wave on the oscilloscope screen to obtain the peak-to-peak voltage reading at the maximum deflection points of the modulation voltage envelope. The sensitivity setting of the current measuring channel would be multiplied by 1 and the modulation envelope pattern at its peak deflection on the oscilloscope screen used to obtain the peak-to-peak current flowing in primary 31.

Accordingly, it was observed that the peak-to-peak voltage maximum excursions were about 880 volts and the peak-to-peak current excursions about 4 amperes for a single firing. In determining the power and energy, below, account would have to be taken of the fact that voltage and current waves each have a duty cycle of 0.5, so that the duty cycle multiplying factor for power would be $(0.5)^2 = 0.25$. Both for instantaneous power and energy at igniter, the transfer efficiency of transformer 30 of 0.9 would have to be considered. If transformer 30 has a turns ratio of 150, then the following conclusions may be drawn from the laboratory experiments and measurements.

| | |
|---|---|
| Current in primary winding 31 | 4 amperes |
| Voltage across primary 31 | 880 volts |
| Voltage across secondary 32 an instant before igniter firing | |
| $880 \times 150 \times 0.9 =$ | 118,800 volts |
| Current in secondary 32 on igniter firing | |
| $(4 \times 0.9)/150 =$ | 24 milliamperes |
| Power delivered to igniter | |
| $880 \times 4 \times 0.25 \times 0.9 =$ | 792 watts |
| Energy to fire igniter | |
| $792 \times 0.833 \times 10^{-3} =$ | 0.66 watt-seconds |

A comparison between the measured values as above, and the theoretically computed values will show close correspondence therebetween.

Referring to FIGS. 1, 8 and 11, the phasor diagram shown in FIG. 8 is a graphical representation of the effect of capacitor 40 presence has in the ignition system. For example, utilizing a system involving the circuit of FIG. 1, such system operates on a transient principle, and it is not a simple matter to compensate for inductive reactances as exhibited by output winding 12 and primary winding 31 inasmuch as frequency spectra, rather than a single frequency as in a steady-state phenomena, is encountered. However, there is one dominant frequency which may be briefly approximated by the relationship $\omega = 1/\sqrt{LC}$ in radian measure, wherein the value of C is obtained by proper selection of capacitance for capacitor 40. In such relationship, L is the sum of the effective inductance seen by looking into the terminals of winding 12 and the self inductance of primary winding 31, and C is the value of capacitor 40. If capacitor 40 is chosen so that its reactance is substantially equal to the reactance of L, since the reactance of C is negative compared to the reactance of L, there will be a tendency for cancellation of reactances at the dominant frequency and the impedance resulting will be approximately resistive, consisting of the resistance of secondary 12 of the output transformer 10 and the primary winding 31 in series. Such value of total resistance will be low, as shown in Table B, and will permit the maximum possible current to flow in primary 31 as delivered by the AC power source. Care would have to be taken to make such that the size of wire of both winding 12 and winding 31 is sufficiently large to handle such current flow.

One may also analyze the function of capacitor 40 in terms other than that of a reactance compensator by a study of FIG. 11, the photographic results obtained on a dual channel oscilloscope, wherein both the voltage and current modulation envelopes were observed and measured using the same time sweep for any one igniter firing, as above discussed. In obtaining such oscilloscopic photograph, it may be seen that the voltage and current envelopes are substantially in phase, meaning that they start and stop about the same time. Hence, capacitor 40 of proper value can be regarded as a phasing device, inasmuch as it did in effect provide an in-phase relationship, or substantially so, between the voltage wave modulation envelope across the primary winding 31 and the current modulation envelope of the current flowing through winding 31, and thereby enables the maximum possible current generated in primary winding 11 of the power source of FIG. 1 to be transferred out of the oscillating circuit to its external load, namely transformer primary winding 31.

As discussed above in the experimental set-up used to obtain the dual trace during the same sweep time, the oscilloscope was switched into the chopper-multiplexer mode, which meant that the two channels were switched at high sampling rate to obtain the voltage and current during the same time frame. Hence in examining FIG. 11, the modulation patterns for both current and voltage, the lower wave position being the current and the upper wave position being the voltage, will have discontinuities therein at the locations in time when switching between these channels occurred.

But it can be seen, that capacitor 40 did accomplish its purpose in that an in-phase or substantially in-phase relationship between the voltage and current modulation envelopes resulted.

Referring to FIGS. 4, 5a–5d, 6 and 7, Tables A and B, Tables (13a)–(13d) and Tables (17a)–(17d), the theoretical basis involving a transient solution of the equivalent circuit FIG. 4 for the actual circuit of FIG. 1, is used to derive the voltage, current, power and energy delivered to an igniter.

The AC power source is assumed to generate a rectangular wave $v_o(t)$ having a voltage magnitude excursion about a zero voltage axis of $\pm V_o/2$, feeding the equivalent circuit, which consists of the effective inductance of the generator $L_o$, and self inductance of the primary winding of the ignition transformer $L_1$, and the series resistance $R_o$ of output winding 12 and the series resistance $R_1$ of the primary winding 31 of the ignition transformer, all in series electrical circuit with capacitor C (capacitor 40 in FIG. 1), wherein primary winding $L_1$ is connected to DC source $V_1$.

Equation (1) gives the expression for the square wave voltage in terms of time, $v_o(t)$, and equation (2) provides the same expression of voltage in direct Laplace transform or complex domain as $v_o(s)$.

The initial current $i_o$ for the Kettering circuit is then evaluated for a period of 1.67 milliseconds, the charging time for the ignition transformer primary selected for these computations. Such current evaluation is shown in equation (3), and the initial voltage $\alpha$ is determined using the initial current, as shown by expression (4).

The loop equation for the voltages about the loop according to Kirchoff's law is given in direct Laplace transform notation at (5).

The solution for the loop current in Laplace transform notation $I_1$ is shown by the expression at (6). To obtain the solution of the current $i_1$ as a function of time, expression (6) is transformed by inverse Laplace techniques, which in this instance may be solved using Cauchy's Residue Theorem by evaluating the residues $A_o$ and $B_o$ at the poles in accordance with (7) through (12). Substituting the values of the parameters from Table B, equation (12) may be simplified as expression (13) which lends itself to be evaluated readily.

Figure 6:
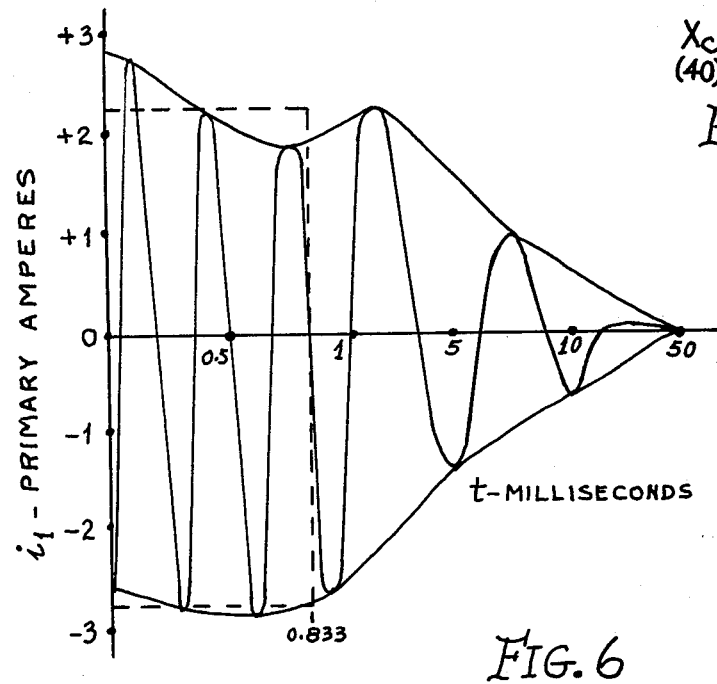
FIG. 6 is a modulation envelope of the computed current in the primary winding of the ignition transformer of FIG. 1.

Expression (13) is evaluated for time periods ranging between zero and 50 milliseconds, by construction of Tables (13a) through (13d), wherein the final result of all summed components for each time period is given in the right hand column of Table (13d), which is then graphically constructed to result in the primary current modulation envelope as depicted by FIG. 6.

To obtain the voltage induced in primary winding 31 due to flow of current therein, the primary current expression in symbolic terms at (12) is differentiated with respect to time and the result thereof multiplied by $-L_1$, in accordance with Faraday's law in induction, shown at (14).

Expression (15) resulting thereby is the complete expression for the voltage induced in primary 31. However, such expression may be simplified for graphing purposes by dropping the sine terms inasmuch as the modulus of each cosine term is substantially greater by a factor of greater than 100 than each sine term. Simplifying expression (15) results in expression (16) for the approximate solution of the induced voltage $e_1$ in primary 31.

By substituting parameter values of Table B in expression (16), the induced voltage in primary 31 is given in numerical terms by equation (17). Equation (17) could be evaluated by use of Tables (17a) through (17d) and the evaluated results for each time period, graphed as FIG. 7, which provides the theoretical modulation envelope of the induced primary voltage.

To determine the energy delivered to an igniter at firing, it is necessary to integrate the product of current and voltage as exemplified by expressions (13) and (17) respectively, over the selected firing period of the igniter, and then multiply the result by the transfer efficiency of ignition transformer 30. Integrating the product of current and voltage expressions is an extremely burdensome task which can be avoided by a graphical solution using the graphed forms of the current and voltage as constructed in FIGS. 6 and 7 respectively, and then taking average values of current and voltage swings about the zero axis over the firing period of an igniter for a specific engine speed. The average values of current and voltage may be graphically approximated by the dashed rectangular outlines in FIGS. 6 and 7. The results thus obtained are multiplied by the duty cycles of the current and voltage curves and by the transfer efficiency of transformer 30 to obtain the energy delivered to an igniter during any one firing period thereof.

Although such results are approximate, they are sufficiently accurate in order to obtain an approximate value for the power and energy level delivered to an igniter for one firing. The firing period selected is based upon a 5 degree firing angle by distributor rotor when used in conjunction with an 8 cylinder engine at rotational speed of 6000 rpm, wherein such firing period at that speed and firing angle is 0.833 milliseconds.

Figure 7:
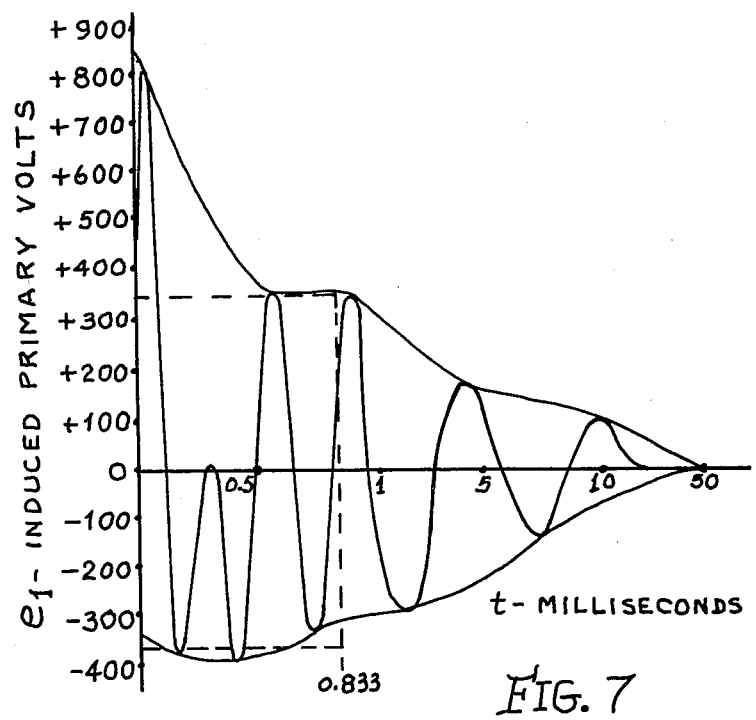
FIG. 7 is a modulation envelope of the computed voltage induced in the primary winding of the ignition transformer of FIG. 1.

Hence, considering the graphical integration using FIGS. 6 and 7:

| | |
|---|---|
| Assumed Ignition Transformer Transfer Transfer Efficiency ($\eta$) | = 0.9 |
| Firing Period (t) | = 0.833 milliseconds |
| Duty Cycle for Current (T) | = 0.5 |
| Duty Cycle for Voltage (T) | = 0.5 |
| Average Primary Current Swing ($i_1$) | = 5 amperes |
| Average Primary Induced Voltage Swing ($e_1$) | = 700 volts |

Therefore, the power provided to any one igniter during firing as expressed by equation (18) for the above stated conditions is approximately 799 watts, and the energy delivered to fire such igniter as stated by expression (19) is 0.665 watt-seconds. It is noted that this computed energy level is almost exactly the measured energy level of 0.660 watt-seconds.

Comparing the computed energy level to the energy level of a typical Kettering ignition system, as given in Table A:

$$N = \frac{\epsilon(\text{inventive system})}{\epsilon(\text{Kettering system})} = \frac{0.665}{0.936 \times 10^{-2}} = 71$$

or an energy advantage of the inventive system over the typical Kettering system of 7100%.

In making computations using the Laplace transform and its inverse, the solutions incorporate integration over infinite time periods so as to permit any transient to decay to zero. Hence, the waveforms of FIGS. 6 and 7 show graphs extending to 50 milliseconds at which time these transients decay to zero. However, keeping in mind that the actual cut off of the current and induced voltage would be in this instance at 0.833 milliseconds, by operation of the timing means, it can be appreciated that such waveforms as in FIGS. 6 and 7 will only be present for a very short period beyond the 0.833 millisecond period, and therefore the modulation envelope portions beyond the 0.833 millisecond periods may be disregarded.

Referring to FIGS. 9, 10 and 11, the photographed oscilloscope patterns for voltage and current may be compared with the computed patterns of FIGS. 6 and 7 which when limited to the 0.833 millisecond firing period represent a fair approximation of the actual patterns obtained by experimentation.

Referring to FIGS. 12 and 13, the photographed arcs of modified igniter type N-13Y Champion with gap adjustement member removed, show the radial arcs obtained of about 0.5 inches diameter each, utilizing the described system for two operative conditions of the system. It is to be noted that in FIG. 12, when distributor rotor is at standstill and the igniter is firing (contactors 50 are open as in FIG. 1), only the AC component is being fed to the igniter over a substantially long period of time. But in FIG. 13, when the rotor of the distributor is being driven at a speed analogous to about 3000 rpm of the engine, both the AC component and the Kettering transient component intermodulated therewith provides such arcing over a substantially short firing period. If it were possible to fire over the same time period as in FIG. 13 and have the rotor of the distributor at standstill, the arcs resulting in FIG. 12 would be substantially less intense and lower in quantity than the arcs resulting from the condition establishing FIG. 13 arcs. Hence the FIG. 13 arcs provide to such igniters extremely high energy levels, to cause all the fuel in the cylinders of the fuel-burning engine to be utilized to produce useful power instead of wasting a good portion of such fuel.

APPENDIX

Tables of Terms, Definitions and Parameter Values and Tabular Solutions of Current and Voltage Equations

Table A

| Symbol | Definitions of Terms Used in Computations |
|---|---|
| t | the variable in the time domain |
| s | the variable in the complex domain (Laplace operator) |
| L | Laplace transform: $f(s) = \int_{t=0}^{t=\infty} f(t) e^{-st} dt$ |
| f(t) | an expression as a function of time |
| f(s) | an expression as a function of the Laplace transform |
| k | quarter-period of one rectangular wave cycle of AC source = $10^{-4}$ seconds |
| $v_o(t)$ | voltage output expression at 12, in the time domain |
| $v_o(s)$ | voltage output expression at 12, in the complex domain and Laplace transformed |
| $I_1$ | current in primary winding 31 expressed in Laplace notation |
| $i_1$ | current in primary winding 31 in the time domain, obtained by taking the inverse Laplace transform of $I_1$: $i_1 = L_{I_1}^{-1} = \frac{1}{2\pi j} \int_{s=-j\infty}^{s=+j\infty} I_1 e^{ts} ds = \Sigma$ Residues at Poles |
| $e_1$ | induced voltage into primary winding 31 = $-L_1 \frac{di_1}{dt}$ |
| $\eta$ | efficiency of power transfer between primary 31 and secondary 32 of transformer 30 = 0.9 |
| T | duty cycle of $i_1$ or $e_1$ of computed responses = 0.5 |
| $i_1$ | average value of primary current swing for period of 0.833 milliseconds |
| $e_1$ | average value of induced voltage swing in primary winding for period of 0.833 milliseconds |
| t | firing period for one igniter of an 8 cylinder engine at 6000 rpm = 0.833 milliseconds |
| P | instantaneous power delivered to igniter = $\eta T^2 i_1 e_1$ |
| $\epsilon$ | energy to one igniter = Pt |
| N | ratio of energy delivered to igniter with respect to energy delivered to same igniter by a Kettering system (Kettering system igniter energy computed at $0.936 \times 10^{-2}$ watt-seconds) |

Table B

| Parameter Symbol | Measured Value | Use |
|---|---|---|
| $L_1$ | $10^{-2}$ henries | self inductance of 31 |
| $L_o$ | $10^{-2}$ henries | effective inductance at output of AC source at 12 |

Table B-continued

| Parameter Symbol | Measured Value | Use |
|---|---|---|
| $L = L_1 + L_o$ | $2 \times 10^{-2}$ henries | |
| $R_1$ | 2.6 ohms | series resistance of $L_1$ |
| $R_o$ | 0.8 ohms | series resistance of winding 12 |
| $R = R_1 + R_o$ | 3.4 ohms | |
| C | 0.2 microfarads | capacitor 40 |
| $V_o$ | 300 volts, peak-to-peak | rectangular wave output of AC source at 12 |

Table (13a)

| t (seconds) | t (milliseconds) | $\frac{t}{\sqrt{LC}}$ | $F1a = 0.995\sin\frac{t}{\sqrt{LC}}$ | $F1b = 0.92\cos\frac{t}{\sqrt{LC}}$ | $F1 = F1a + F1b$ |
|---|---|---|---|---|---|
| 0 | 0 | 0 | 0 | + .920 | + .920 |
| $1 \times 10^{-6}$ | .001 | + .02 | + .020 | + .920 | + .940 |
| $1 \times 10^{-5}$ | .01 | + .2 | + .199 | + .902 | +1.101 |
| $.5 \times 10^{-4}$ | .05 | +1 | + .837 | + .497 | +1.334 |
| $1 \times 10^{-4}$ | .1 | +2 | + .904 | − .383 | + .521 |
| $1.5 \times 10^{-4}$ | .15 | +3 | + .140 | − .911 | − .771 |
| $2 \times 10^{-4}$ | .2 | +4 | − .753 | − .601 | −1.354 |
| $2.5 \times 10^{-4}$ | .25 | +5 | − .954 | + .261 | − .693 |
| $3 \times 10^{-4}$ | .3 | +6 | − .278 | + .883 | + .605 |
| $4 \times 10^{-4}$ | .4 | +8 | + .984 | − .134 | + .850 |
| $5 \times 10^{-4}$ | .5 | +10 | − .541 | − .772 | −1.313 |
| $5.5 \times 10^{-4}$ | .55 | +11 | − .994 | + .004 | − .990 |
| $6 \times 10^{-4}$ | .6 | +12 | − .534 | + .776 | + .242 |
| $6.5 \times 10^{-4}$ | .65 | +13 | + .418 | + .835 | +1.253 |
| $7 \times 10^{-4}$ | .7 | +14 | + .986 | + .126 | +1.112 |
| $8 \times 10^{-4}$ | .8 | +16 | − .287 | − .881 | −1.168 |
| $9 \times 10^{-4}$ | .9 | +18 | − .747 | + .607 | − .140 |
| $1 \times 10^{-3}$ | 1.0 | +20 | + .908 | + .375 | +1.283 |
| $2 \times 10^{-3}$ | 2.0 | +40 | + .741 | − .614 | + .127 |
| $3 \times 10^{-3}$ | 3.0 | +60 | − .313 | − .876 | −1.189 |
| $4;33\ 10^{-3}$ | 4.0 | +80 | − .989 | − .102 | −1.091 |
| $5 \times 10^{-3}$ | 5.0 | +100 | − .503 | + .793 | + .290 |
| $6 \times 10^{-3}$ | 6.0 | +120 | + .578 | + .749 | +1.327 |
| $7 \times 10^{-3}$ | 7.0 | +140 | + .975 | − .182 | + .793 |
| $8 \times 10^{-3}$ | 8.0 | +160 | + .218 | − .989 | − .771 |
| $9 \times 10^{-3}$ | 9.0 | +180 | − .797 | − .551 | −1.348 |
| $1 \times 10^{-2}$ | 10.0 | +200 | − .869 | + .448 | − .421 |
| $2 \times 10^{-2}$ | 20.0 | +400 | − .847 | − .483 | −1.330 |
| $3 \times 10^{-2}$ | 30.0 | +600 | + .044 | − .919 | − .875 |
| $4 \times 10^{-2}$ | 40.0 | +800 | + .890 | − .412 | + .478 |
| $5 \times 10^{-2}$ | 50.0 | +1000 | + .823 | + .517 | +1.340 |

Table (13b)

| t (seconds) | t (milliseconds) | $\frac{(t-2k)}{\sqrt{LC}}$ | $\sin\frac{(t-2k)}{\sqrt{LC}}$ | $F2 = -2.04\sin\frac{(t-2k)}{\sqrt{LC}}$ |
|---|---|---|---|---|
| 0 | 0 | − 4 | + .757 | − 1.54 |
| $1 \times 10^{-6}$ | .001 | − 3.98 | + .744 | − 1.52 |
| $1 \times 10^{-5}$ | .01 | − 3.8 | + .612 | − 1.25 |
| $.5 \times 10^{-4}$ | .05 | − 3 | − .141 | + .29 |
| $1 \times 10^{-4}$ | .1 | − 2 | − .909 | + 1.85 |
| $1.5 \times 10^{-4}$ | .15 | − 1 | − .841 | + 1.72 |
| $2 \times 10^{-4}$ | .2 | 0 | 0 | 0 |
| $2.5 \times 10^{-4}$ | .25 | + 1 | + .841 | − 1.72 |
| $3 \times 10^{-4}$ | .3 | + 2 | + .909 | − 1.85 |
| $4 \times 10^{-4}$ | .4 | + 4 | − .757 | + 1.54 |
| $5 \times 10^{-4}$ | .5 | + 6 | − .279 | + .57 |
| $5.5 \times 10^{-4}$ | .55 | + 7 | + .657 | − 1.34 |
| $6 \times 10^{-4}$ | .6 | + 8 | + .989 | − 2.02 |
| $6.5 \times 10^{-4}$ | .65 | + 9 | + .412 | − .84 |
| $7 \times 10^{-4}$ | .7 | + 10 | − .544 | + 1.11 |
| $8 \times 10^{-4}$ | .8 | + 12 | − .537 | + 1.10 |
| $9 \times 10^{-4}$ | .9 | + 14 | + .991 | − 2.02 |
| $1 \times 10^{-3}$ | 1.0 | + 16 | − .288 | + .59 |
| $2 \times 10^{-3}$ | 2.0 | + 36 | − .992 | + 2.02 |
| $3 \times 10^{-3}$ | 3.0 | + 56 | − .522 | + 1.06 |
| $4 \times 10^{-3}$ | 4.0 | + 76 | + .566 | − 1.15 |
| $5 \times 10^{-3}$ | 5.0 | + 96 | + .984 | − 2.01 |
| $6 \times 10^{-3}$ | 6.0 | +116 | + .237 | − .48 |
| $7 \times 10^{-3}$ | 7.0 | +136 | − .790 | + 1.61 |
| $8 \times 10^{-3}$ | 8.0 | +156 | − .882 | + 1.80 |
| $9 \times 10^{-3}$ | 9.0 | +176 | + .071 | − .14 |
| $1 \times 10^{-2}$ | 10.0 | +196 | + .940 | − 1.92 |
| $2 \times 10^{-2}$ | 20.0 | +396 | + .159 | − .32 |
| $3 \times 10^{-2}$ | 30.0 | +596 | − .363 | + .74 |
| $4 \times 10^{-2}$ | 40.0 | +796 | − .923 | + 1.88 |

Table (13b)-continued

| t (seconds) | t (milliseconds) | $\frac{(t-2k)}{\sqrt{LC}}$ | $\sin \frac{(t-2k)}{\sqrt{LC}}$ | $F2 = -2.04 \sin \frac{(t-2k)}{\sqrt{LC}}$ |
|---|---|---|---|---|
| $5\times10^{-2}$ | 50.0 | +996 | −.115 | +.23 |

Table (13c)

| t (seconds) | t (milliseconds) | $\frac{(t-4k)}{\sqrt{LC}}$ | $\sin \frac{(t-4k)}{\sqrt{LC}}$ | $F3 = +2.08 \sin \frac{(t-4k)}{\sqrt{LC}}$ |
|---|---|---|---|---|
| 0 | 0 | −8 | −.989 | −2.06 |
| $1\times10^{-6}$ | .001 | −7.98 | −.992 | −2.06 |
| $1\times10^{-5}$ | .01 | −7.8 | −.999 | −2.08 |
| $.5\times10^{-4}$ | .05 | −7 | −.657 | −1.37 |
| $1\times10^{-4}$ | .1 | −6 | +.279 | +.58 |
| $1.5\times10^{-4}$ | .15 | −5 | +.959 | +1.99 |
| $2\times10^{-4}$ | .2 | −4 | +.757 | +1.57 |
| $2.5\times10^{-4}$ | .25 | −3 | −.141 | −.29 |
| $3\times10^{-4}$ | .3 | −2 | −.909 | −1.89 |
| $4\times10^{-4}$ | .4 | 0 | 0 | 0 |
| $5\times10^{-4}$ | .5 | +2 | +.909 | +1.89 |
| $5.5\times10^{-4}$ | .55 | +3 | +.141 | +.29 |
| $6\times10^{-4}$ | .6 | +4 | −.757 | −1.57 |
| $6.5\times10^{-4}$ | .65 | +5 | −.959 | −1.99 |
| $7\times10^{-4}$ | .7 | +6 | −.279 | −.58 |
| $8\times10^{-4}$ | .8 | +8 | +.989 | +2.06 |
| $9\times10^{-4}$ | .9 | +10 | −.544 | −1.13 |
| $1\times10^{-3}$ | 1.0 | +12 | −.537 | −1.12 |
| $2\times10^{-3}$ | 2.0 | +32 | +.551 | +1.15 |
| $3\times10^{-3}$ | 3.0 | +52 | +.987 | +2.05 |
| $4\times10^{-3}$ | 4.0 | +72 | +.254 | +.53 |
| $5\times10^{-3}$ | 5.0 | +92 | −.779 | −1.62 |
| $6\times10^{-3}$ | 6.0 | +112 | −.890 | −1.85 |
| $7\times10^{-3}$ | 7.0 | +132 | +.053 | +.11 |
| $8\times10^{-3}$ | 8.0 | +152 | +.933 | +1.94 |
| $9\times10^{-3}$ | 9.0 | +172 | +.709 | +1.47 |
| $1\times10^{-2}$ | 10.0 | +192 | −.355 | −.74 |
| $2\times10^{-2}$ | 20.0 | +392 | +.644 | +1.34 |
| $3\times10^{-2}$ | 30.0 | +592 | +.982 | +2.04 |
| $4\times10^{-2}$ | 40.0 | +792 | +.313 | +.65 |
| $5\times10^{-2}$ | 50.0 | +992 | −.677 | −1.41 |

Table (13d)

| t (seconds) | t (milliseconds) | 170t | $e^{-170t}$ | $0.948^{-170t}$ | F1+F2+F3 | $i_1$ |
|---|---|---|---|---|---|---|
| 0 | 0 | 0 | 1.000 | .948 | −2.68 | −2.54 |
| $1\times10^{-6}$ | .001 | .00017 | .999 | .983 | −2.64 | −2.60 |
| $1\times10^{-5}$ | .01 | .0017 | .998 | .946 | −2.23 | −2.11 |
| $.5\times10^{-4}$ | .05 | .0085 | .992 | .940 | +.25 | +.24 |
| $1\times10^{-4}$ | .1 | .017 | .983 | .932 | +2.95 | +2.75 |
| $1.5\times10^{-4}$ | .15 | .0255 | .975 | .924 | +2.94 | +2.72 |
| $2\times10^{-4}$ | .2 | .034 | .967 | .917 | +.22 | +.20 |
| $2.5\times0\ 10^{-4}$ | .25 | .0425 | .958 | .908 | −2.70 | −2.45 |
| $3\times10^{-4}$ | .3 | .051 | .950 | .901 | −3.13 | −2.82 |
| $4\times10^{-4}$ | .4 | .068 | .934 | .885 | +2.39 | +2.12 |
| $5\times10^{-4}$ | .5 | .085 | .919 | .871 | +1.15 | +1.00 |
| $5.5\times10^{-4}$ | .55 | .0935 | .911 | .864 | −2.04 | −1.76 |
| $6\times10^{-4}$ | .6 | .102 | .903 | .856 | −3.35 | −2.87 |
| $6.5\times10^{-4}$ | .65 | .1105 | .895 | .848 | −1.58 | −1.34 |
| $7\times10^{-4}$ | .7 | .119 | .888 | .842 | +1.64 | +1.38 |
| $8\times10^{-4}$ | .8 | .136 | .873 | .828 | +1.99 | +1.65 |
| $9\times10^{-4}$ | .9 | .153 | .858 | .813 | −3.29 | −2.67 |
| $1\times10^{-3}$ | 1.0 | .170 | .844 | .804 | +.75 | +.60 |
| $2\times10^{-3}$ | 2.0 | .340 | .712 | .675 | +3.30 | +2.23 |
| $3\times10^{-3}$ | 3.0 | .510 | .600 | .569 | +1.92 | +1.09 |
| $4\times10^{-3}$ | 4.0 | .680 | .507 | .481 | −1.71 | −.82 |
| $5\times10^{-3}$ | 5.0 | .850 | .427 | .405 | −3.34 | −1.35 |
| $6\times10^{-3}$ | 6.0 | 1.02 | .361 | .342 | −1.00 | −.34 |
| $7\times10^{-3}$ | 7.0 | 1.19 | .304 | .288 | +2.51 | +.72 |
| $8\times10^{-3}$ | 8.0 | 1.36 | .257 | .244 | +2.97 | +.72 |
| $9\times10^{-3}$ | 9.0 | 1.53 | .217 | .206 | −.02 | −.004 |
| $1\times10^{-2}$ | 10.0 | 1.7 | .183 | .173 | −3.73 | −.65 |
| $2\times10^{-2}$ | 20.0 | 3.4 | .033 | .031 | −.31 | −.01 |
| $3\times10^{-2}$ | 30.0 | 5.1 | .006 | .006 | +1.91 | +.01 |
| $4\times10^{-2}$ | 40.0 | 6.8 | .001 | .001 | +3.01 | +.003 |
| $5\times10^{-2}$ | 50.0 | 8.5 | .0002 | .0002 | +.16 | 0 |

Table (17a)

| t (seconds) | t (milliseconds) | $\frac{t}{\sqrt{LC}}$ | $\cos \frac{t}{\sqrt{LC}}$ | $\sin \frac{t}{\sqrt{LC}}$ | $F4a = 319 \cos \frac{t}{\sqrt{LC}}$ | $F4b = 138 \sin \frac{t}{\sqrt{LC}}$ | $F4 = F4a + F4b$ |
|---|---|---|---|---|---|---|---|
| 0 | 0 | 0 | +1 | 0 | +319 | 0 | +319 |
| 1×10⁻⁶ | .001 | + .02 | + .999 | + .020 | +319 | + 3 | +322 |
| 1×10⁻⁵ | .01 | + .2 | + .980 | + .199 | +313 | + 27 | +340 |
| .5×10⁻⁴ | .05 | +1 | + .540 | + .841 | +172 | +116 | +288 |
| 1×10⁻⁴ | .1 | +2 | − .416 | + .909 | −133 | +125 | − 8 |
| 1.5×10⁻⁴ | .15 | +3 | − .990 | + .141 | −316 | + 19 | −297 |
| 2×10⁻⁴ | .2 | +4 | − .654 | − .757 | −209 | −104 | −313 |
| 2.5×10⁻⁴ | .25 | +5 | + .284 | − .959 | + 91 | −132 | − 41 |
| 3×10⁻⁴ | .3 | +6 | + .960 | − .279 | +306 | − 39 | +267 |
| 4×10⁻⁴ | .4 | +8 | − .146 | + .989 | − 47 | +136 | + 89 |
| 5×10⁻⁴ | .5 | +10 | − .839 | − .544 | −268 | − 75 | −343 |
| 5.5×10⁻⁴ | .55 | +11 | + .004 | − .999 | + 1 | −138 | −137 |
| 6×10⁻⁴ | .6 | +12 | + .843 | − .537 | +269 | − 75 | +194 |
| 6.5×10⁻⁴ | .65 | +13 | + .907 | + .420 | +289 | + 58 | +347 |
| 7×10⁻⁴ | .7 | +14 | + .137 | + .991 | + 44 | +137 | +181 |
| 8×10⁻⁴ | .8 | +16 | − .958 | − .288 | −306 | − 40 | −346 |
| 9×10⁻⁴ | .9 | +18 | + .660 | − .751 | +211 | −104 | +107 |
| 1×10⁻³ | 1.0 | +20 | + .480 | + .913 | +153 | +126 | +279 |
| 2×10⁻³ | 2.0 | +40 | − .667 | + .745 | −213 | +103 | −110 |
| 3×10⁻³ | 3.0 | +60 | − .952 | − .305 | −304 | − 42 | −346 |
| 4×10⁻³ | 4.0 | +80 | − .110 | − .994 | − 35 | −137 | −172 |
| 5×10⁻³ | 5.0 | +100 | + .862 | − .506 | +275 | − 70 | +205 |
| 6×10⁻³ | 6.0 | +120 | + .814 | + .580 | +260 | + 80 | +340 |
| 7×10⁻³ | 7.0 | +140 | − .198 | + .980 | − 63 | +135 | + 72 |
| 8×10⁻³ | 8.0 | +160 | − .976 | + .219 | −311 | + 30 | −281 |
| 9×10⁻³ | 9.0 | +180 | − .598 | − .801 | −191 | −111 | −302 |
| 1×10⁻² | 10.0 | +200 | + .847 | − .873 | +270 | −120 | +150 |
| 2×10⁻² | 20.0 | +400 | − .525 | − .851 | −167 | −117 | −284 |
| 3×10⁻² | 30.0 | +600 | − .999 | + .044 | −319 | + 6 | −313 |
| 4×10⁻² | 40.0 | +800 | − .448 | + .894 | −143 | +123 | − 20 |
| 5×10⁻² | 50.0 | +1000 | + .562 | + .827 | +179 | +114 | +293 |

Table (17b)

| t (seconds) | t (milliseconds) | $\frac{(t-2k)}{\sqrt{LC}}$ | $\cos \frac{(t-2k)}{\sqrt{LC}}$ | $F5 = +306 \cos \frac{(t-2k)}{\sqrt{LC}}$ |
|---|---|---|---|---|
| 0 | 0 | −4 | +.654 | +200 |
| 1×10⁻⁶ | .001 | −3.98 | +.669 | +205 |
| 1×10⁻⁵ | .01 | −3.8 | +.791 | +242 |
| .5×10⁻⁴ | .05 | −3 | +.999 | +303 |
| 1×10⁻⁴ | .1 | −2 | +.416 | +128 |
| 1.5×10⁻⁴ | .15 | −1 | −.540 | −165 |
| 2×10⁻⁴ | .2 | 0 | +1 | +306 |
| 2.5×10⁻⁴ | .25 | +1 | +.540 | +165 |
| 3×10⁻⁴ | .3 | +2 | −.416 | −128 |
| 4×10⁻⁴ | .4 | +4 | −.654 | −200 |
| 5×10⁻⁴ | .5 | +6 | +.960 | +294 |
| 5.5×10⁻⁴ | .55 | +7 | +.754 | +231 |
| 6×10⁻⁴ | .6 | +8 | −.146 | −45 |
| 6.5×10⁻⁴ | .65 | +9 | −.911 | −278 |
| 7×10⁻⁴ | .7 | +10 | −.839 | −257 |
| 8×10⁻⁴ | .8 | +12 | +.844 | +258 |
| 9×10⁻⁴ | .9 | +14 | +.137 | +42 |
| 1×10⁻³ | 1.0 | +16 | −.958 | −293 |
| 2×10⁻³ | 2.0 | +36 | −.128 | −39 |
| 3×10⁻³ | 3.0 | +56 | +.853 | +261 |
| 4×10⁻³ | 4.0 | +76 | +.824 | +252 |
| 5×10⁻³ | 5.0 | +96 | −.180 | −55 |
| 6×10⁻³ | 6.0 | +116 | −.972 | −297 |
| 7×10⁻³ | 7.0 | +136 | −.613 | −188 |
| 8×10⁻³ | 8.0 | +156 | +.472 | +145 |
| 9×10⁻³ | 9.0 | +176 | +.997 | +305 |
| 1×10⁻² | 10.0 | +196 | +.342 | +105 |
| 2×10⁻² | 20.0 | +396 | +.987 | +302 |
| 3×10⁻² | 30.0 | +596 | +.620 | +190 |
| 4×10⁻² | 40.0 | +796 | −.384 | −117 |
| 5×10⁻² | 50.0 | +996 | −.993 | −304 |

Table (17c)

| t (seconds) | t (milliseconds) | $\frac{(t-4k)}{\sqrt{LC}}$ | $\cos \frac{(t-4k)}{\sqrt{LC}}$ | $F6 = -312 \cos \frac{(t-4k)}{\sqrt{LC}}$ |
|---|---|---|---|---|
| 0 | 0 | −8 | +.146 | − 46 |
| 1×10⁻⁶ | .001 | −7.98 | +.126 | − 40 |
| 1×10⁻⁵ | .01 | −7.8 | −.054 | + 17 |

Table (17c)-continued

| t (seconds) | t (milliseconds) | $\frac{(t-4k)}{\sqrt{LC}}$ | $\cos \frac{(t-4k)}{\sqrt{LC}}$ | $F6 = -312 \cos \frac{(t-4k)}{\sqrt{LC}}$ |
|---|---|---|---|---|
| $.5 \times 10^{-4}$ | .05 | −7 | −.754 | +235 |
| $1 \times 10^{-4}$ | .1 | −6 | −.960 | +300 |
| $1.5 \times 10^{-4}$ | .15 | −5 | −.284 | +88 |
| $2 \times 10^{-4}$ | .2 | −4 | +.654 | −204 |
| $2.5 \times 10^{-4}$ | .25 | −3 | +.990 | −309 |
| $3 \times 10^{-4}$ | .3 | −2 | +.416 | −130 |
| $4 \times 10^{-4}$ | .4 | 0 | +1 | −312 |
| $5 \times 10^{-4}$ | .5 | +2 | −.416 | +130 |
| $5.5 \times 10^{-4}$ | .55 | +3 | −.990 | +309 |
| $6 \times 10^{-4}$ | .6 | +4 | −.654 | +204 |
| $6.5 \times 10^{-4}$ | .65 | +5 | +.284 | − 88 |
| $7 \times 10^{-4}$ | .7 | +6 | +.960 | −300 |
| $8 \times 10^{-4}$ | .8 | +8 | −.146 | +46 |
| $9 \times 10^{-4}$ | .9 | +10 | −.839 | +262 |
| $1 \times 10^{-3}$ | 1.0 | +12 | +.844 | −263 |
| $2 \times 10^{-3}$ | 2.0 | +32 | +.834 | −260 |
| $3 \times 10^{-3}$ | 3.0 | +52 | −.163 | + 51 |
| $4 \times 10^{-3}$ | 4.0 | +72 | −.967 | +302 |
| $5 \times 10^{-3}$ | 5.0 | +92 | −.626 | +196 |
| $6 \times 10^{-3}$ | 6.0 | +112 | +.456 | −142 |
| $7 \times 10^{-3}$ | 7.0 | +132 | +.999 | −312 |
| $8 \times 10^{-3}$ | 8.0 | +152 | +.359 | −112 |
| $9 \times 10^{-3}$ | 9.0 | +172 | −.706 | +220 |
| $1 \times 10^{-2}$ | 10.0 | +192 | −.935 | +291 |
| $2 \times 10^{-2}$ | 20.0 | +392 | −.765 | +239 |
| $3 \times 10^{-2}$ | 30.0 | +592 | +.189 | − 59 |
| $4 \times 10^{-2}$ | 40.0 | +792 | +.950 | −296 |
| $5 \times 10^{-2}$ | 50.0 | +992 | +.736 | −229 |

Table (17d)

| t (seconds) | t (milliseconds) | 170t | $e^{-170t}$ | F4+F5+F6 | $e_1$ |
|---|---|---|---|---|---|
| 0 | 0 | 0 | 1.000 | +473 | +473 |
| $1 \times 10^{-6}$ | .001 | .00017 | .999 | +407 | +407 |
| $1 \times 10^{-5}$ | .01 | .0017 | .998 | +599 | +598 |
| $.5 \times 10^{-4}$ | .05 | .0085 | .992 | +826 | +819 |
| $1 \times 10^{-4}$ | .1 | .017 | .983 | +420 | +413 |
| $1.5 \times 10^{-4}$ | .15 | .0255 | .975 | −374 | −365 |
| $2 \times 10^{-4}$ | .2 | .034 | .967 | −211 | −204 |
| $2.5 \times 10^{-4}$ | .25 | .0425 | .958 | −185 | −177 |
| $3 \times 10^{-4}$ | .3 | .051 | .950 | +9 | +8 |
| $4 \times 10^{-4}$ | .4 | .068 | .934 | −423 | −395 |
| $5 \times 10^{-4}$ | .5 | .085 | .919 | +81 | +74 |
| $5.5 \times 10^{-4}$ | .55 | .0935 | .911 | +403 | +367 |
| $6 \times 10^{-4}$ | .6 | .102 | .903 | +353 | +319 |
| $6.5 \times 10^{-4}$ | .65 | .1105 | .895 | −19 | −17 |
| $7 \times 10^{-4}$ | .7 | .119 | .888 | −376 | −334 |
| $8 \times 10^{-4}$ | .8 | .136 | .873 | −42 | −37 |
| $9 \times 10^{-4}$ | .9 | .153 | .858 | +411 | +353 |
| $1 \times 10^{-3}$ | 1.0 | .170 | .844 | −277 | −234 |
| $2 \times 10^{-3}$ | 2.0 | .340 | .712 | −409 | −291 |
| $3 \times 10^{-3}$ | 3.0 | .510 | .600 | −34 | −20 |
| $4 \times 10^{-3}$ | 4.0 | .680 | .507 | +303 | +154 |
| $5 \times 10^{-3}$ | 5.0 | .850 | .427 | +346 | +148 |
| $6 \times 10^{-3}$ | 6.0 | 1.02 | .361 | −99 | −36 |
| $7 \times 10^{-3}$ | 7.0 | 1.19 | .304 | −428 | −130 |
| $8 \times 10^{-3}$ | 8.0 | 1.36 | .257 | −248 | −64 |
| $9 \times 10^{-3}$ | 9.0 | 1.53 | .217 | +223 | +48 |
| $1 \times 10^{-2}$ | 10.0 | 1.7 | .183 | +546 | +100 |
| $2 \times 10^{-2}$ | 20.0 | 3.4 | .033 | +257 | +8 |
| $3 \times 10^{-2}$ | 30.0 | 5.1 | .006 | −182 | −1 |
| $4 \times 10^{-2}$ | 40.0 | 6.8 | .001 | −433 | −0.4 |
| $5 \times 10^{-2}$ | 50.0 | 8.5 | .0002 | −240 | −0.05 |

What is claimed is:

1. A system for energizing at least one igniter of a fuel burning engine, said system having first and second states of operation, comprising the combination of:

an ignition transformer having a single primary winding;

alternating current means having an output transformer with an output winding, said output winding being in series circuit with said primary winding, said output winding providing alternating current during the second state;

a capacitor electrically coupled to said series circuit; and control means, connected to said capacitor and series circuit, for enabling said series circuit to be charged during the first state and for enabling a transient current to flow in said series circuit and capacitor during the second state, said transient current intermodulating with the alternating current during the second state.

2. The invention as stated in claim 1, wherein said capacitor constitutes means for compensating at least in part for the inductive reactance of said primary winding and said output winding thereby increasing current flow in said primary winding.

3. The invention as stated in claim 1, wherein said alternating current means has active oscillatory means having input circuit means, said input circuit means being intermittently biased by the control means so as to permit current to flow in said input circuit means during said second state and to inhibit current from flowing in said input circuit means during said first state.

4. The invention as stated in claim 1, wherein said alternating current means includes Darlington semiconductors.

5. The invention as stated in claim 1, wherein said control means comprises:
   a timer connected to said capacitor;
   an electronic circuit coupling said timer with said capacitor; and
   an electronic switch, fed by said electronic circuit, for biasing said alternating current means so as to inhibit said alternating current means from providing energy during the first state and for enabling said alternating current means to provide energy during the second state.

6. The invention as stated in claim 1, wherein said control means comprises:
   a timer connected to said alternating current means; and
   an electronic switch, connected between said timer and capacitor.

* * * * *